(12) United States Patent
Sakata

(10) Patent No.: US 11,505,126 B2
(45) Date of Patent: Nov. 22, 2022

(54) ELECTRIC STORAGE UNIT FOR VEHICLE OUTSIDE MIRROR DEVICE, AND VEHICLE OUTSIDE MIRROR DEVICE

(71) Applicant: Ichikoh Industries, Ltd., Isehara (JP)

(72) Inventor: Ikuo Sakata, Isehara (JP)

(73) Assignee: Ichikoh Industries, Ltd., Isehara (JP)

(*) Notice: Subject to any disclaimer, the term of this patent is extended or adjusted under 35 U.S.C. 154(b) by 34 days.

(21) Appl. No.: 17/252,907

(22) PCT Filed: Jun. 20, 2019

(86) PCT No.: PCT/JP2019/024516
§ 371 (c)(1),
(2) Date: Dec. 16, 2020

(87) PCT Pub. No.: WO2019/244981
PCT Pub. Date: Dec. 26, 2019

(65) Prior Publication Data
US 2021/0261054 A1    Aug. 26, 2021

(30) Foreign Application Priority Data

Jun. 20, 2018 (JP) .............................. JP2018-116810

(51) Int. Cl.
*B60R 1/074* (2006.01)
(52) U.S. Cl.
CPC .................................. *B60R 1/074* (2013.01)
(58) Field of Classification Search
CPC ................................................... B60R 1/074
USPC ................................................ 359/877, 841
See application file for complete search history.

(56) References Cited

U.S. PATENT DOCUMENTS

| 5,781,354 | A | * | 7/1998 | Sakata | ................. | B60R 1/074 |
| | | | | | | 359/872 |
| 6,022,113 | A | * | 2/2000 | Stolpe | ................. | B60R 1/074 |
| | | | | | | 359/872 |
| 6,793,358 | B2 | * | 9/2004 | Sakata | ................. | B60R 1/074 |
| | | | | | | 359/872 |
| 7,104,660 | B2 | * | 9/2006 | Sakata | ................. | B60R 1/074 |
| | | | | | | 359/872 |

(Continued)

FOREIGN PATENT DOCUMENTS

| JP | 2005-178656 A | 7/2005 |
| JP | 2006-15953 A | 1/2006 |
| JP | 2016-190546 A | 11/2016 |

OTHER PUBLICATIONS

International Search Report dated Aug. 13, 2019 in PCT/JP2019/024516 filed on June 20, 2019, 1 page.

(Continued)

*Primary Examiner* — Ricky D Shafer
(74) *Attorney, Agent, or Firm* — Oblon, McClelland, Maier & Neustadt, L.L.P.

(57) ABSTRACT

The present invention includes a shaft, a gear case, a cover, a motor, and a rotational force transmission mechanism. The gear case has an upright wall. The cover has a fitting wall and a cover wall. The upright wall and the fitting wall are provided with a fitting member. The fitting member includes a fitting protruding unit, and an elastically deformable fitting piece having a fitting opening unit. As a result, the present invention can sufficiently reduce the number of parts and can surely prevent the cover from rattling.

11 Claims, 15 Drawing Sheets

(56) References Cited

U.S. PATENT DOCUMENTS

| | | | | |
|---|---|---|---|---|
| 7,427,142 B2* | 9/2008 | Onuki | ................ | B60R 1/074 |
| | | | | 359/877 |
| 7,441,912 B2* | 10/2008 | Onuki | ................ | B60R 1/074 |
| | | | | 359/877 |
| 7,533,997 B2* | 5/2009 | Onuki | ................ | B60R 1/074 |
| | | | | 359/877 |
| 7,883,224 B2* | 2/2011 | Onuki | ................ | B60R 1/074 |
| | | | | 359/877 |
| 8,845,112 B2* | 9/2014 | Sakata | ................ | B60R 1/074 |
| | | | | 359/877 |
| 10,797,558 B2* | 10/2020 | Motomiya | ............ | B60R 1/074 |
| 2008/0297927 A1* | 12/2008 | Onuki | ................ | B60R 1/074 |
| | | | | 359/841 |
| 2011/0255188 A1* | 10/2011 | Watanabe | ............ | B60R 1/076 |
| | | | | 359/841 |
| 2013/0107383 A1 | 5/2013 | Kudo | | |
| 2018/0111557 A1 | 4/2018 | Motomiya et al. | | |

OTHER PUBLICATIONS

Extended European Search Repon dated Dec. 20, 2021 in European Patent Application No. 19822090.7, 7 pages.

* cited by examiner

ELECTRIC STORAGE UNIT FOR VEHICLE OUTSIDE MIRROR DEVICE, AND VEHICLE OUTSIDE MIRROR DEVICE

TECHNICAL FIELD

The present disclosure relates to an electric storage unit for a vehicle outside mirror device and a vehicle outside mirror device.

BACKGROUND ART

Examples of an electric storage unit for a vehicle outside mirror device and a vehicle outside mirror device, which can reduce the number of parts and prevent a cover from rattling, are disclosed in PTL 1.

A electric mirror of PTL 1 includes a base member, a shaft member, a case, a cover, and a mirror main body, and is provided with a distortedly deformable sealing member arranged at a contact point between the case and the cover, a locking hole provided on the cover, and a locking projection provided on the case and locked with the locking hole when the seal member is distortedly deformed. The electric mirror of PTL 1 does not require a screw member or a cushion material, and thus the number of parts can be reduced. Moreover, in the electric mirror of PTL 1, the cover is attached to the case by the sealing member, the locking hole, and the locking projection in a state of receiving a reaction force from the case side, thereby making it possible to prevent the cover from rattling.

CITATION LIST

Patent Literature

PTL 1: Japanese Unexamined Patent Application Publication No. 2005-178656

SUMMARY OF THE INVENTION

Problems to be Solved by the Invention

However, since the electric mirror disclosed in PTL 1 requires the sealing member, it is not possible to sufficiently reduce the number of parts. Therefore, in the electric mirror of PTL 1, it is conceivable that the sealing member is eliminated. However, in this case, a gap is formed between the inner surface of the locking hole and the outer surface of the locking projection due to the locus of the locking hole at the time of locking and the component tolerance. As a result, if the sealing member is eliminated in the electric mirror of PTL 1, it may not be possible to reliably prevent the cover from rattling due to the gap between the locking hole and the locking projection. Thus, in the electric mirror of PTL 1, it is difficult to achieve both of sufficiently reducing the number of parts and surely preventing the cover from rattling.

Therefore, an object of the present disclosure is to provide an electric storage unit for a vehicle outside mirror device and a vehicle outside mirror device, which can sufficiently reduce the number of parts and can surely prevent the cover from rattling.

Means for Solving the Problem

An electric storage unit for a vehicle outside mirror device according to one aspect of the present disclosure is an electric storage unit for a vehicle outside mirror device that electrically rotates a mirror assembly with respect to a vehicle body. The electric storage unit includes a shaft fixed to the vehicle body via a base, a gear case rotatably attached to the shaft, to which the mirror assembly is attached, a cover attached to the gear case, and a motor and a rotational force transmission mechanism housed in the gear case and the cover. In the electric storage unit, the gear case has an upright wall surrounding the motor and the rotational force transmission mechanism and the upper portion of the upright wall is open, the cover has a fitting wall fitted from outside onto the periphery of the upper portion of the upright wall and a cover wall covering the opening unit of the upright wall, the upright wall and the fitting wall are provided with a fitting member for assembling the gear case and the cover together, and the fitting member includes a fitting protruding unit provided on the gear case, and an elastically deformable fitting piece provided on the cover and having a fitting opening unit into which the fitting protruding unit is fitted, and the elastically deformable fitting piece is configured to elastically deform in a direction of a center line of the shaft to be fitted with the fitting protruding unit.

Effect of the Invention

According to the present disclosure, it is possible to provide an electric storage unit for a vehicle outside mirror device and a vehicle outside mirror device, which can sufficiently reduce the number of parts and can surely prevent the cover from rattling.

MODE FOR CARRYING OUT THE INVENTION

Hereinafter, each embodiment will be described in detail with reference to the accompanying drawings.

Figure 16:
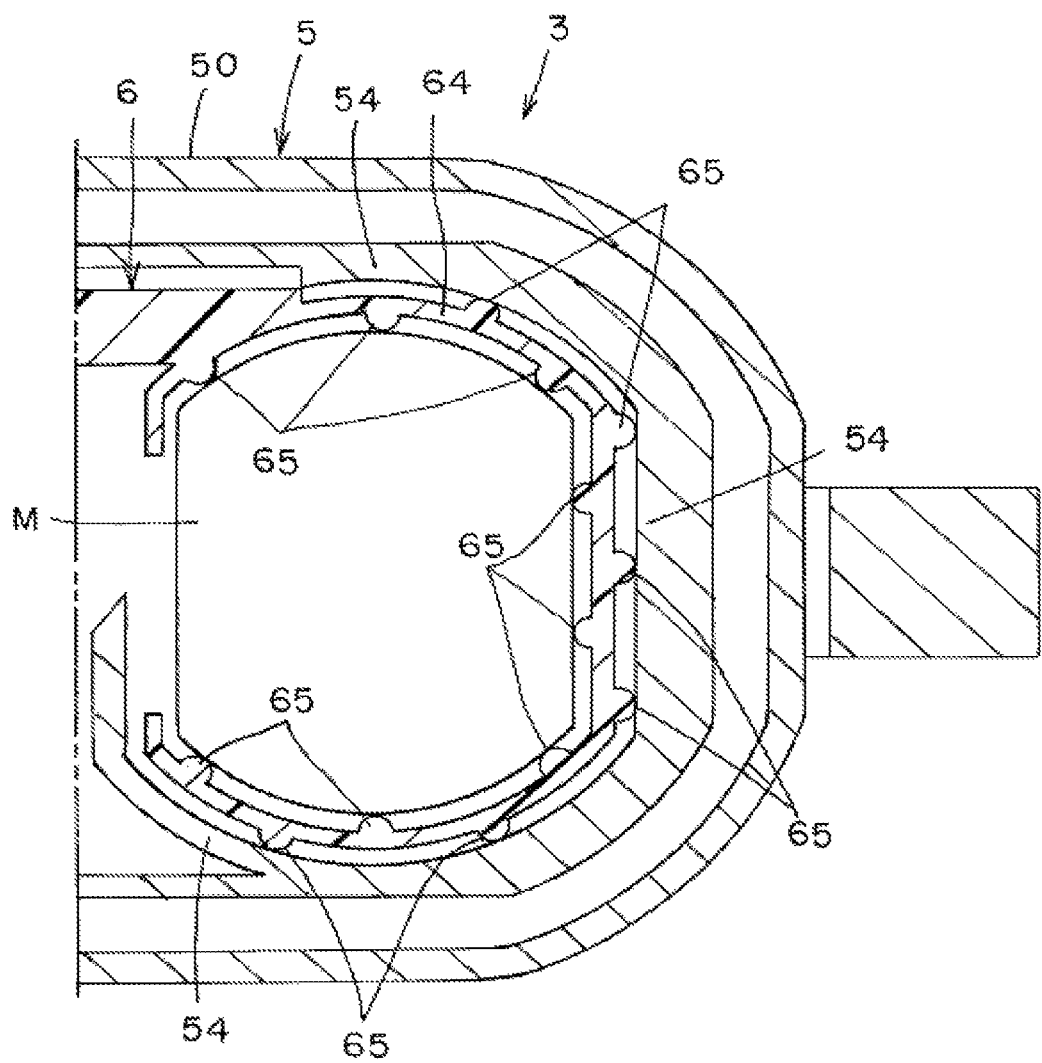
FIG. 16 is a partially enlarged traverse cross-sectional view (a partially enlarged cross-sectional view taken along XVI-XVI line of FIG. 3) illustrating a state in which a motor is fitted and held.

In this specification and the claims on the attached sheet, the front, rear, upper, lower, left, and right are defined as the front, rear, upper, lower, left, and right in a state where an electric storage unit for a vehicle outside mirror device and a vehicle outside mirror device according to the present invention are mounted on a vehicle, respectively. Since the drawings are schematic views, main parts are illustrated, parts other than the main parts are omitted, and hatching is partially omitted. In FIG. 16, the internal structure of a motor and hatching are omitted.

Explanation of Configuration of Embodiment

Hereinafter, the configurations of an electric storage unit for a vehicle outside mirror device and a vehicle outside mirror device according to the present embodiment will be described.

Explanation of Electric Storable Door Mirror Device 1

Figure 1:
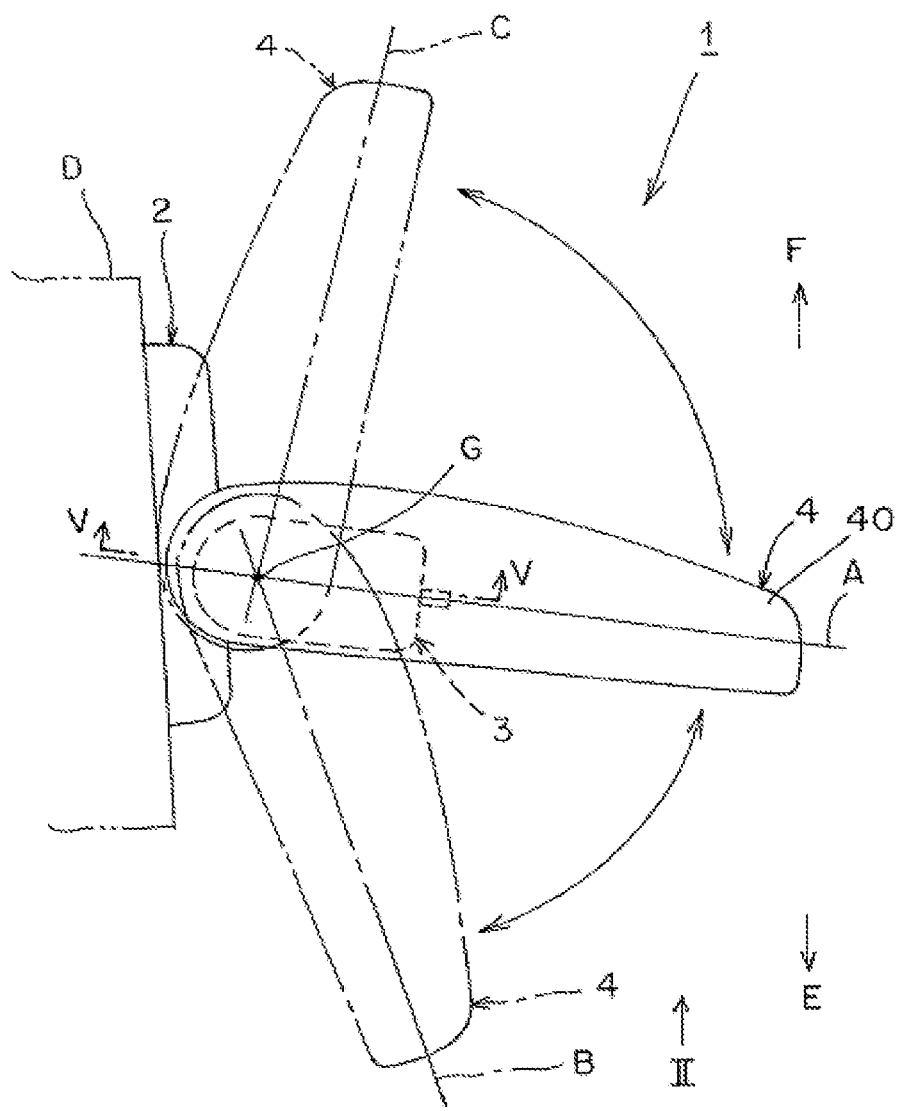
FIG. 1 is a plan view of a usage state illustrating an embodiment of an electric storage unit for a vehicle outside mirror device and a vehicle outside mirror device according to the present invention.

In FIG. 1, reference character 1 is a vehicle outside mirror device according to the present embodiment, and in this example, an electric storable door mirror device (door mirror to be electrically stored). The electric storable door mirror device 1 is mounted on each of left and right doors D (the door on the right side is illustrated and the door on the left side is not illustrated) of an automobile (vehicle). Hereinafter, a configuration of the electric storable door mirror device 1 mounted on the door D on the right side of the automobile will be described. The configuration of the electric storable door mirror device mounted on the left door of the automobile is the same as the configuration of the electric storable door mirror device 1 of the present embodiment, and thus the description thereof will be omitted.

As illustrated in FIG. 1, the electric storable door mirror device 1 includes a base (mirror base) 2, an electric storage unit 3, and a mirror assembly 4. The base 2 is fixed to the door D that is a vehicle body. The mirror assembly 4 is rotatably attached to the base 2 via the electric storage unit 3. In other words, the mirror assembly 4 is rotatably attached to the door D via the electric storage unit 3 and the base 2.

Explanation of Mirror Assembly 4

As illustrated in FIG. 1, the mirror assembly 4 rotates about a rotation center line G with respect to the base 2. For example, it rotates between a use position A and a rearward storage position B and between the use position A and a forward tilted position C, backward (clockwise as viewed from above) or forward (counterclockwise as viewed from above). In FIG. 1, reference character E indicates the rearward of the vehicle, and reference character F indicates the frontward of the vehicle.

Figure 2:
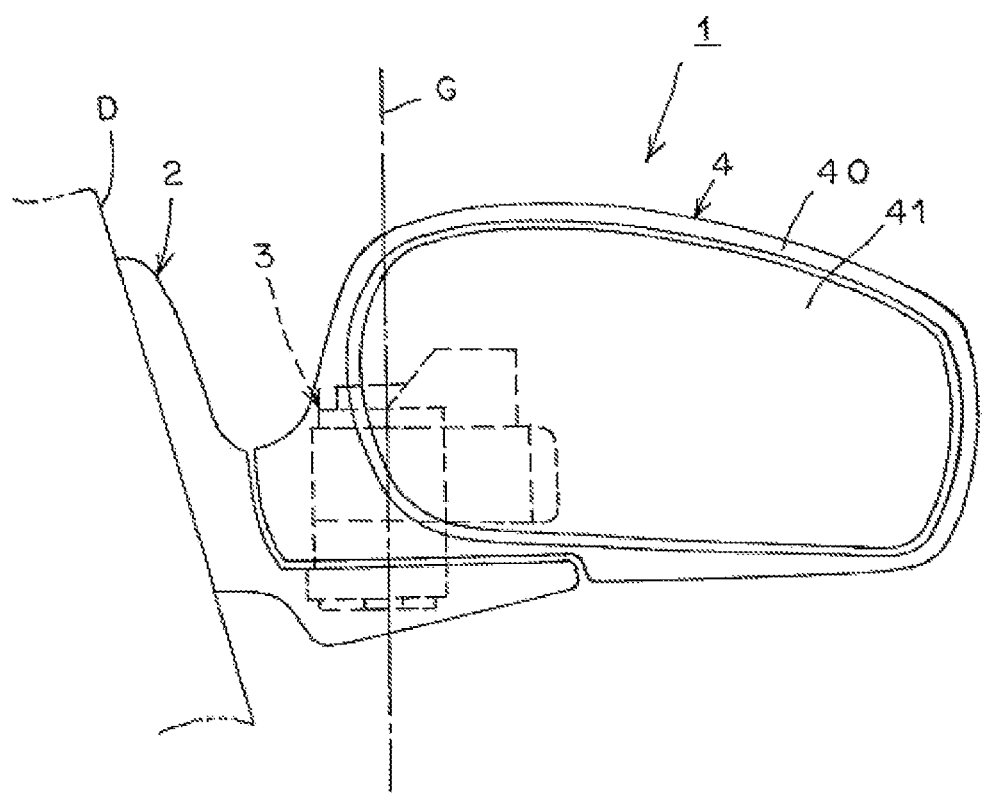
FIG. 2 is a front view illustrating a usage state (a view as viewed in the direction of the arrow II in FIG. 1, also a view as viewed from the rear E side of a vehicle toward the front F side of the vehicle).

As illustrated in FIGS. 1 and 2, the mirror assembly 4 includes a mirror housing 40, a mounting bracket (not illustrated), a power unit (not illustrated), and a mirror (mirror unit) 41. The mounting bracket is attached to the mirror housing 40. The power unit is attached to the mounting bracket. The mirror 41 is attached to the power unit and the mirror 41 can be tilted up, down, left and right. The mirror 41 is disposed in an opening unit of the mirror housing 40 on the rear E side of the vehicle.

Explanation of Electric Storage Unit 3

The electric storage unit 3 electrically rotates the mirror assembly 4 with respect to the door D. As illustrated in FIGS. 1 to 6, the electric storage unit 3 includes a shaft 20, a gear case 5, a cover 6, a motor M, and a rotational force transmission mechanism 7.

The shaft 20 is fixed to the door D via the base 2. The gear case 5 is rotatably attached to the shaft 20. The mirror assembly 4 is attached to the gear case 5 via the mounting bracket. The cover 6 is attached to the gear case 5. The shaft 20 penetrates the inside of the gear case 5 and the cover 6. The motor M and the rotational force transmission mechanism 7 are housed in the gear case 5 and the cover 6.

Explanation of Rotational Force Transmission Mechanism 7

Figure 5:
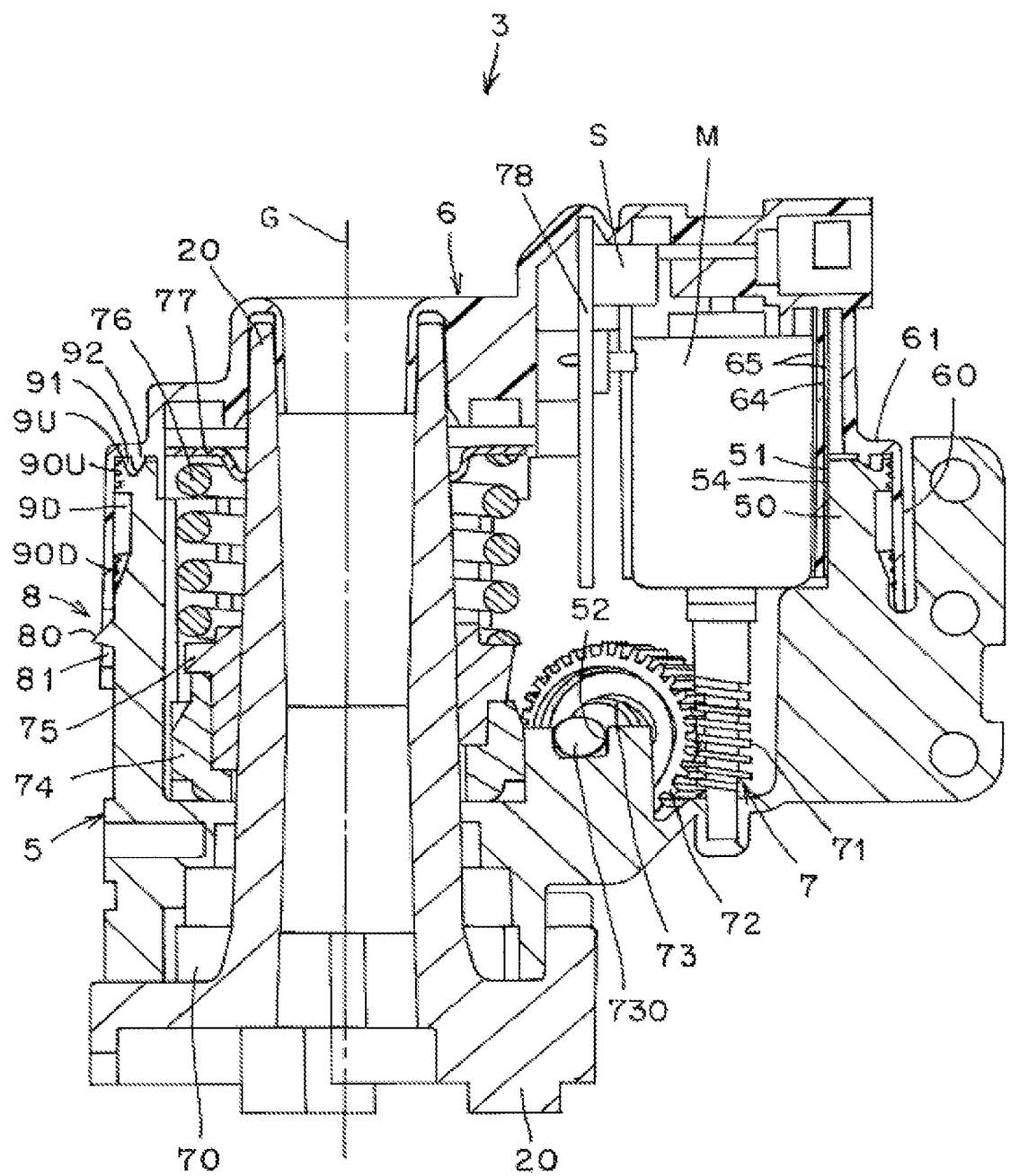
FIG. 5 is a vertical cross-sectional view (a cross-sectional view taken along V-V line of FIG. 1) illustrating the electric storage unit.
Figure 6:
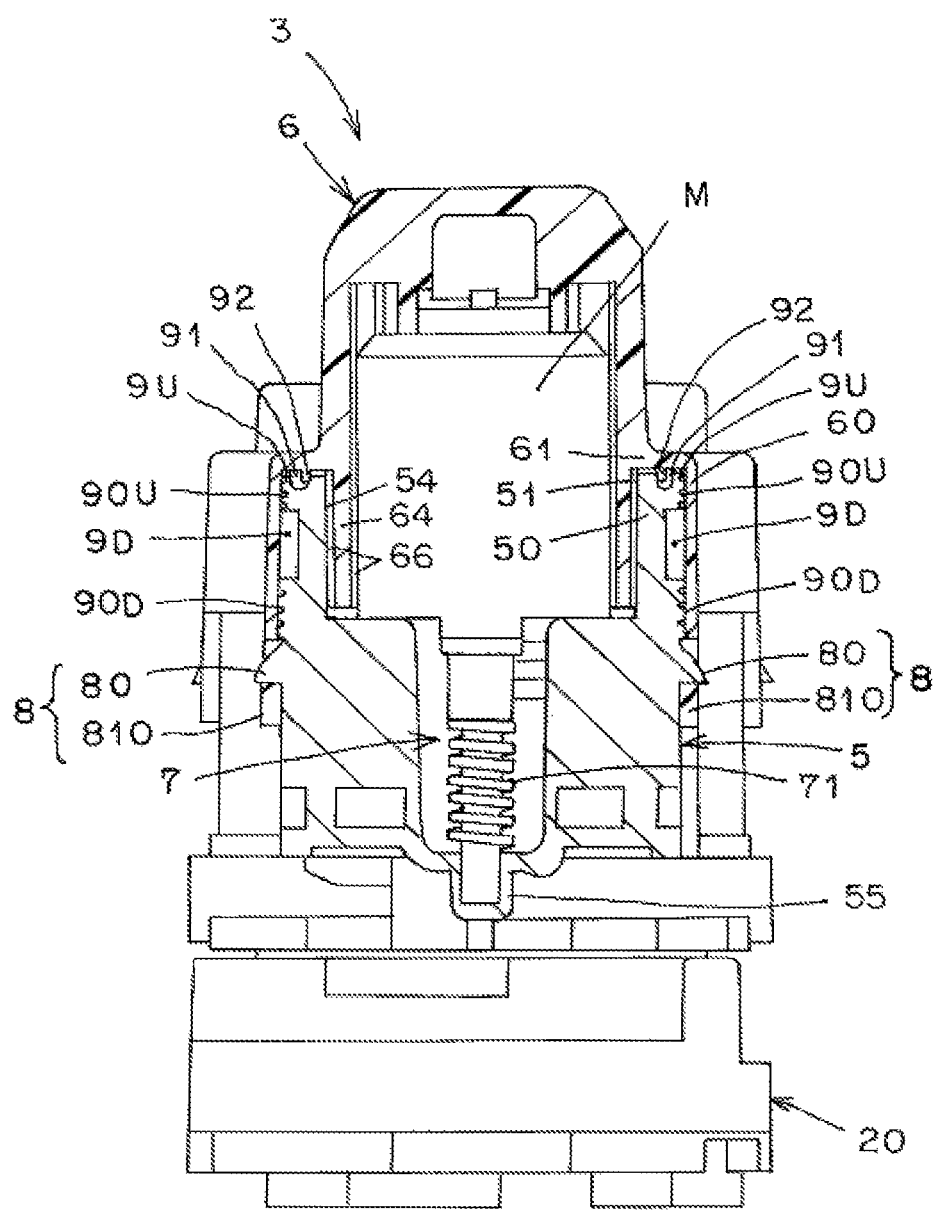
FIG. 6 is a vertical cross-sectional view (a cross-sectional view taken along VI-VI line of FIG. 3) illustrating the electric storage unit.

As illustrated in FIGS. 5 and 6, the rotational force transmission mechanism 7 includes a reduction mechanism, a clutch mechanism, and a stopper member 70. The reduction mechanism includes a first worm gear (first worm) 71 that is a first gear, a helical gear (worm wheel) 72 that is a second gear that meshes with the first worm gear 71, a second worm gear (second worm) 73 that is a third gear, and a clutch gear (worm wheel) 74 that is a final gear that meshes with the second worm gear 73.

One end (lower end) of the first worm gear 71 is rotatably borne by a bearing unit 55 described below in the gear case 5. The other end (upper end) of the first worm gear 71 is connected to the output shaft of the motor M. The helical gear 72 is fixedly fitted to a shaft 730 of the second worm gear 73. The shaft 730 of the second worm gear 73 is rotatably borne by bearing units 52 described below in the gear case 5. The helical gear 72 and the second worm gear 73 rotate integrally.

The clutch mechanism includes the clutch gear 74, a clutch holder 75, a spring 76, and a push nut 77. The stopper member 70 is interposed between the shaft 20 and the gear case 5.

Explanation of Motor M

The outer shape of the motor M is formed of metal, and is substantially a rigid body because deformation will affect the operation. As illustrated in FIG. 5, a substrate 78 is electrically connected to the motor M via a terminal. A socket S is provided on the substrate 78. A connector 79 is electrically connected to the socket S. The substrate 78 and the socket S are attached to the cover 6. The connector 79 is removable from the cover 6.

Explanation of Gear Case 5

Since the gear case 5 is a member that connects the shaft 20 attached to the door D and the mirror housing 40 of the mirror assembly 4, it needs to be made of a highly rigid material. An example of the highly rigid material is PA (nylon) containing glass fiber. As illustrated in FIGS. 5 and 6, the gear case 5 has an upright wall 50 that surrounds the motor M and the rotational force transmission mechanism 7. An upper portion 51 (hereinafter, referred to as "upper opening unit 51") of the upright wall 50 is open.

As illustrated in FIGS. 5, 6, 12, 14, and 15, the bearing unit 55 for bearing a lower end of the first worm gear 71 is provided on a bottom of the gear case 5. On the bottom of the gear case 5, two bearing units 52 for bearing both ends of the shaft 730 of the second worm gear 73 are provided. A rotation center line H of the shaft 730 of the second worm gear 73 and the center line G (rotation center line G) of the shaft 20 are in a state of being perpendicular (a state of being orthogonal) to each other. On the bottom of the gear case 5, two positioning protruding units 53 serving as positioning units of the cover 6 are further provided in the proximity of the two bearing units 52.

As illustrated in FIGS. 5, 6, 12, and 16, an inner surface of the upright wall 50 of the gear case 5 is provided with an enclosure unit 54 that has a shape similar to the outer shape of the motor M to surround the motor M from the outside. The enclosure unit 54 in this example surrounds about two-thirds to about three-quarters of the outer circumference of the motor M.

Explanation of Cover 6

As illustrated in FIGS. 5 and 6, the cover 6 has a fitting wall 60 that is fitted onto the periphery of the upper portion of the upright wall 50 from the outside, and a cover wall 61 that covers the upper opening unit 51 of the upright wall 50. The cover 6 does not need to be rigid. On the contrary, the cover 6 is made of an elastic resin material because it is provided with fitting pieces 81 and 810 of fitting members 8 described below.

Figure 13:
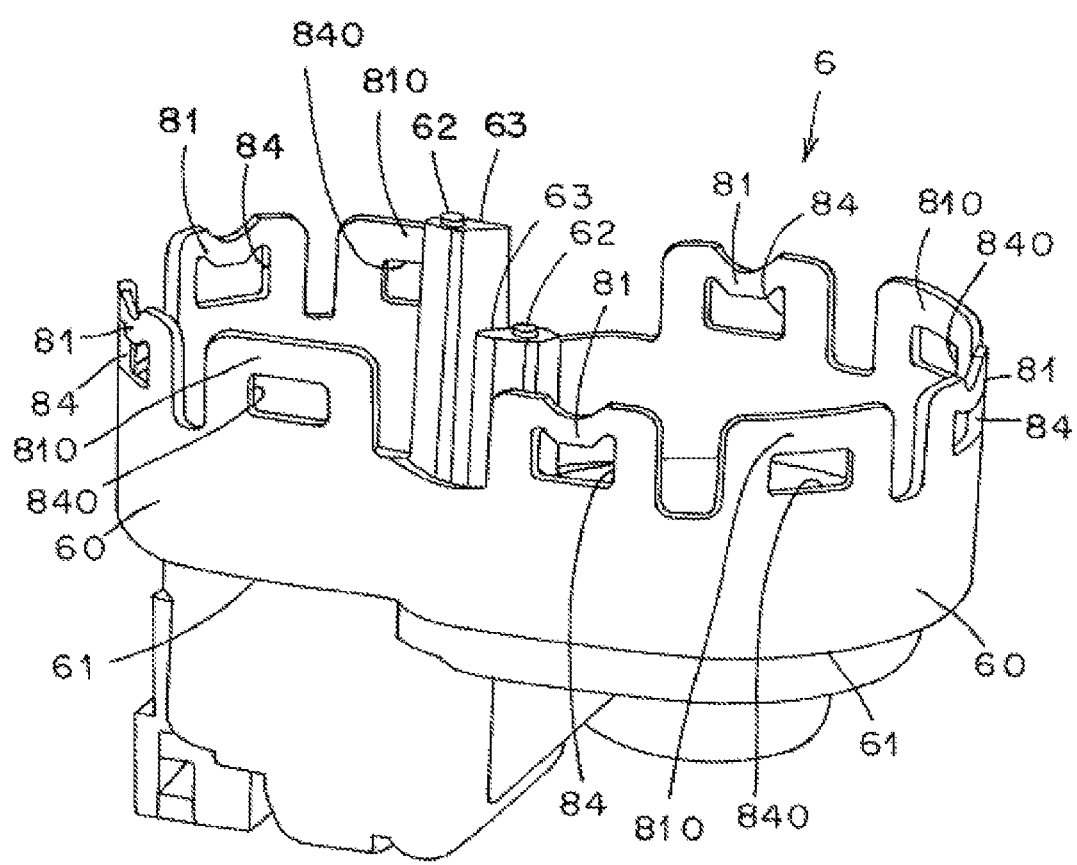
FIG. 13 is a perspective view illustrating a cover (a perspective view of the cover turned upside down as viewed from diagonally above).
Figure 14:
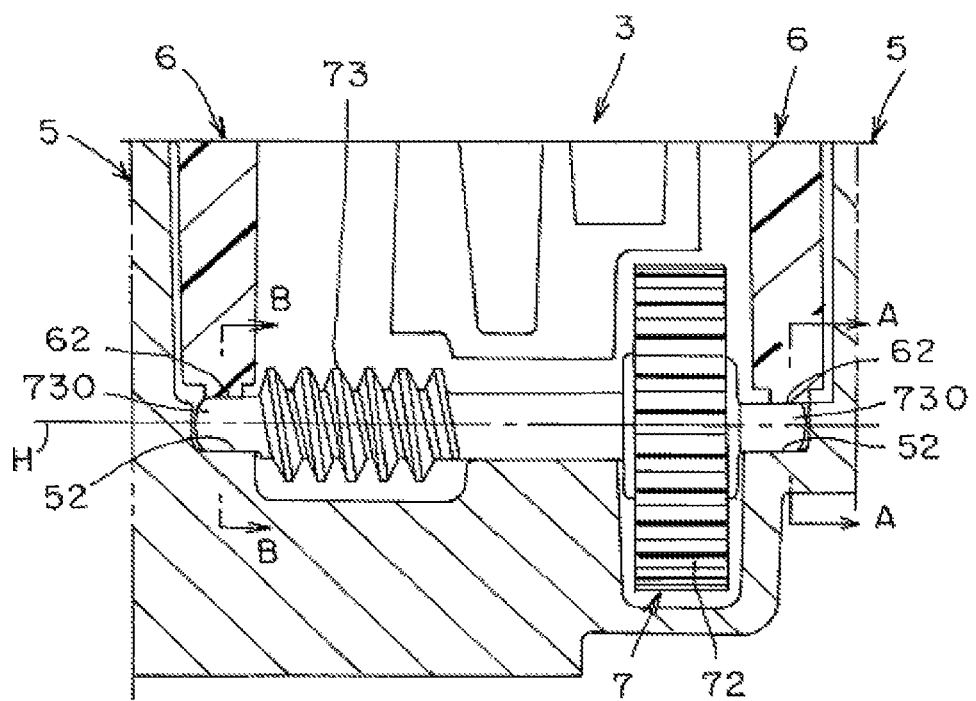
FIG. 14 is a partially enlarged vertical cross-sectional view illustrating a state in which a worm gear is held in a bearing.
Figure 15:
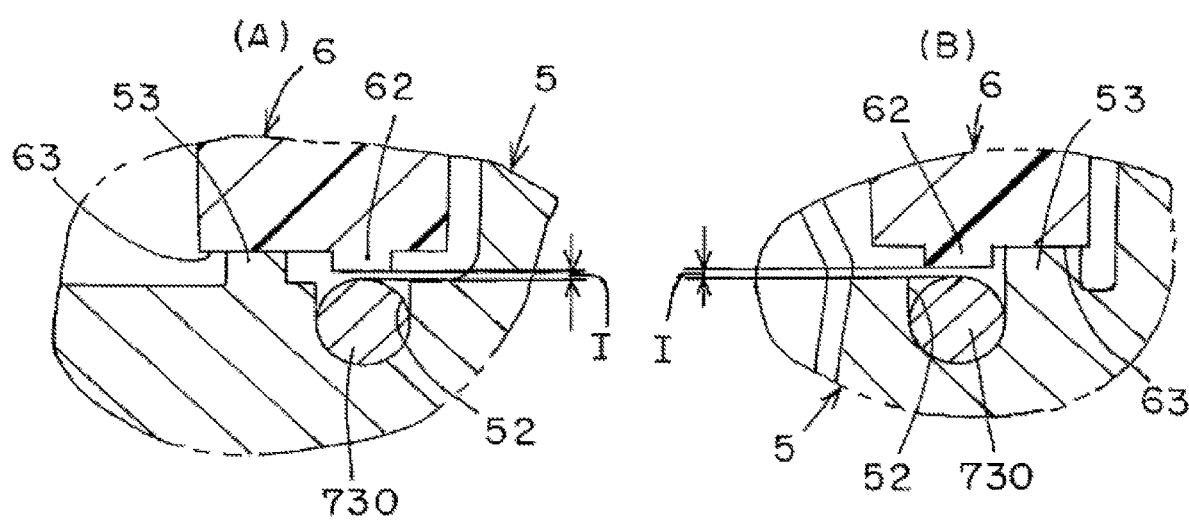
FIG. 15 illustrates partially enlarged vertical cross-sectional views illustrating a clearance between the worm gear and the cover and a state in which the cover is positioned with respect to the gear case. (A) is a partially enlarged vertical cross-sectional view taken along A-A line of FIG. 14. (B) is a partially enlarged vertical cross-sectional view taken along B-B line of FIG. 14.

As illustrated in FIGS. 13, 14, and 15, the cover 6 is provided with two holding units 62 holding both ends of the shaft 730 of the second worm gear 73, maintaining a clearance in the direction of the center line G of the shaft 20, and facing the two bearing units 52. The cover 6 is further provided with two positioning contact surfaces 63 serving as positioning units of the cover 6 so as to face the two positioning protruding units 53 and be in the proximity of the two holding units 62. The positioning contact surfaces 63 of the cover 6 and the positioning protruding units 53 of the gear case 5 form a positioning unit that defines the position of the cover 6 with respect to the gear case 5 in the center line G direction of the shaft 20.

As illustrated in FIGS. 5, 6 and 16, the cover 6 is provided integrally with an interposition member 64 that has a shape similar to the outer shape of the motor M and is interposed between the enclosure unit 54 of the gear case 5 and the motor M in an elastically deformed state. The interposition member 64 in this example surrounds about two-thirds to about three-quarters of the outer circumference of the motor M as with the enclosure unit 54. The interposition member 64 is provided with ribs 65 in the direction of the center line G of the shaft 20 and each of the ribs 65 contacts with the enclosure unit 54 or the motor M. The ribs 65 that contact with the enclosure unit 54 and the ribs 65 that contact with the motor M are arranged alternately.

Explanation of Fitting Member 8

As illustrated in FIGS. 3 to 6, the upright wall 50 of the gear case 5 and the fitting wall 60 of the cover 6 are provided with the fitting member 8 for assembling the gear case 5 and the cover 6 together. The fitting member 8 includes fitting protruding units 80 and the fitting pieces 81 and 810. The fitting protruding units 80 are provided below a lower narrow passage unit 90D of the gear case 5 described below. The fitting pieces 81 and 810 are provided below the lower narrow passage unit 90D in the cover 6.

The fitting pieces 81 and 810 are provided with fitting opening units 84 and 840 into which the fitting protruding units 80 is fitted. As illustrated in FIGS. 7 to 10, by fitting the fitting protruding unit 80 into the fitting opening unit 84 or 840, the fitting protruding unit 80 and the fitting piece 81 or 810 are fitted to each other. In this example, the fitting pieces include an elastically deformable fitting piece 81 that is elastically deformed in the direction of the center line G (rotation center line G) of the shaft 20 to fit with the fitting protruding unit 80, and a general fitting piece 810 that is not elastically deformed in the center line G direction of the shaft 20 but fits with the fitting protruding unit 80.

Figure 8:
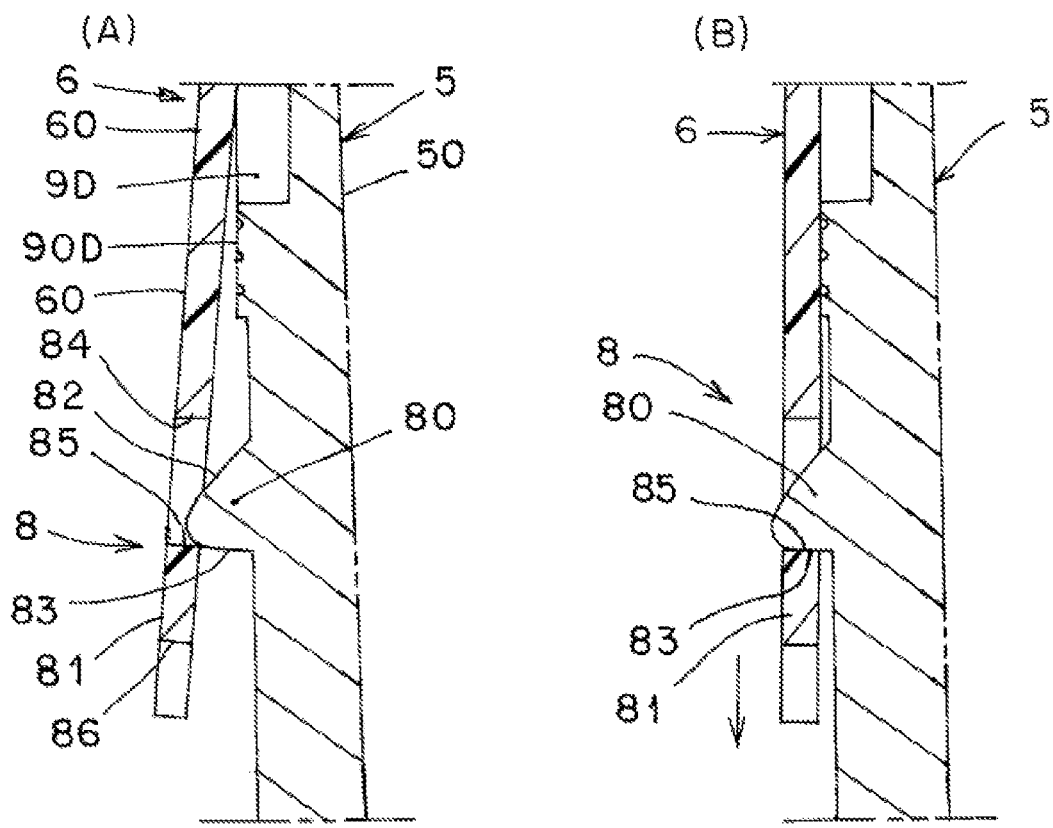
FIG. 8 illustrates partially enlarged vertical cross-sectional views illustrating the fitting member. (A) is a partially enlarged vertical cross-sectional view (a partially enlarged cross-sectional view taken along line A-A of FIG. 7(A)) illustrating a state in which the elastically deformable fitting piece is elastically deformed. (B) is a partially enlarged vertical cross-sectional view (a partially enlarged cross-sectional view taken along line B-B of FIG. 7(B)) illustrating a state in which the fitting protruding unit and the elastically deformable fitting piece are fitted to each other.
Figure 10:
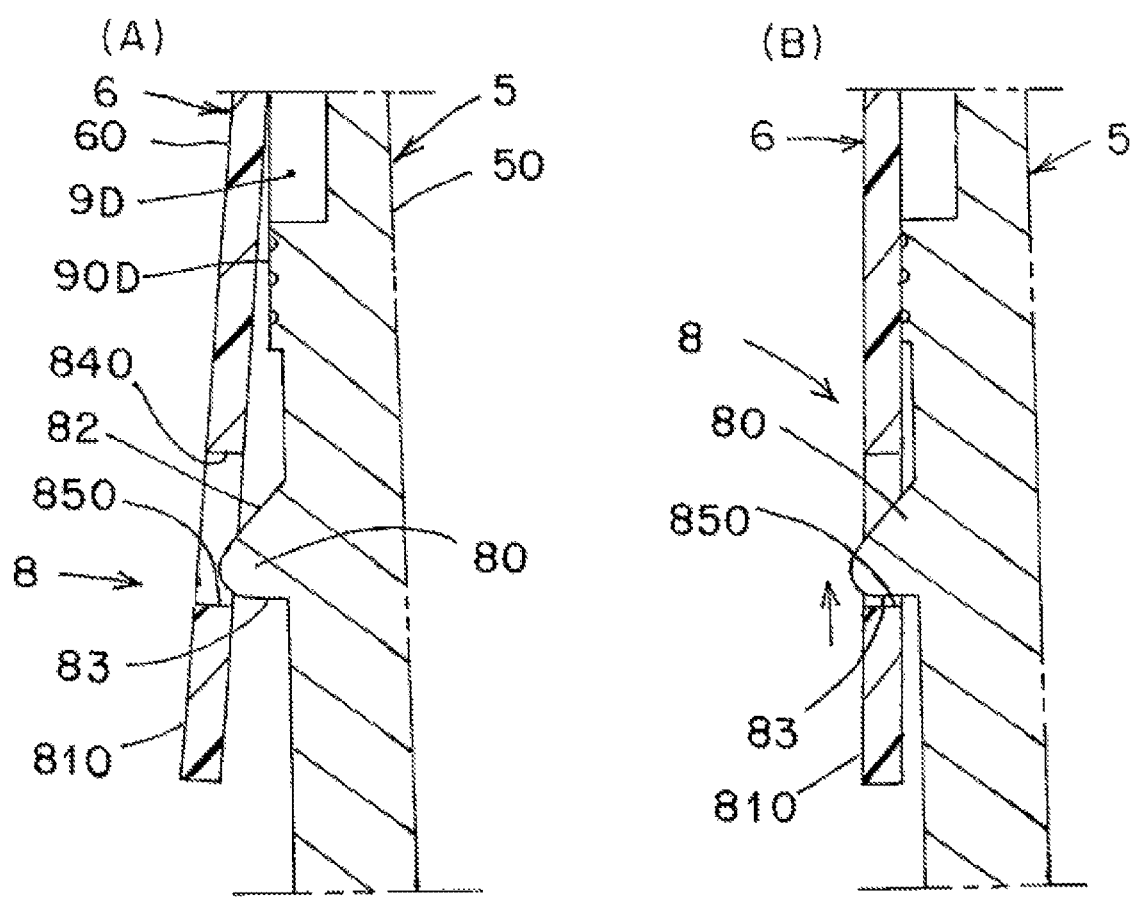
FIG. 10 illustrates partially enlarged vertical cross-sectional views illustrating a state in which the fitting protruding unit and the general fitting piece are fitted to each other. (A) is a partially enlarged vertical cross-sectional view (a partially enlarged cross-sectional view taken along line X-X of FIG. 9) illustrating a state before the fitting protruding unit and the general fitting piece are fitted to each other. (B) is a partially enlarged vertical cross-sectional view (a partially enlarged cross-sectional view taken along line X-X of FIG. 9) illustrating a state in which the fitting protruding unit, and the general fitting piece are fitted to each other.

As illustrated in FIGS. 8 and 10, the fitting protruding unit 80 protrudes from the outer surface of the upright wall 50 of the gear case 5. The fitting protruding unit 80 has an upper inclined surface 82 and a lower horizontal surface 83.

Figure 9:
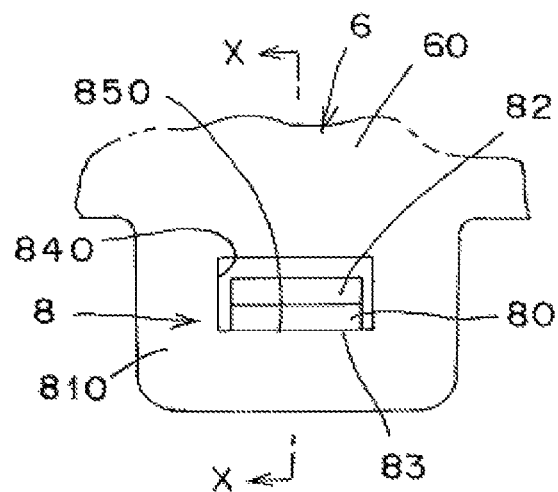
FIG. 9 is a partially enlarged front view illustrating a state in which the fitting protruding unit and a general fitting piece are fitted to each other.

As illustrated in FIG. 9, the general fitting piece 810 has a quadrangular (rectangular) shape. As illustrated in FIG. 9, the fitting opening unit 840 of the general fitting piece 810 has a quadrangular (rectangular) shape that has one size smaller than that of the general fitting piece 810. A lower edge surface of the fitting opening unit 840 forms a contact surface 850 that contacts with the horizontal surface 83 of the fitting protruding unit 80.

Figure 7:
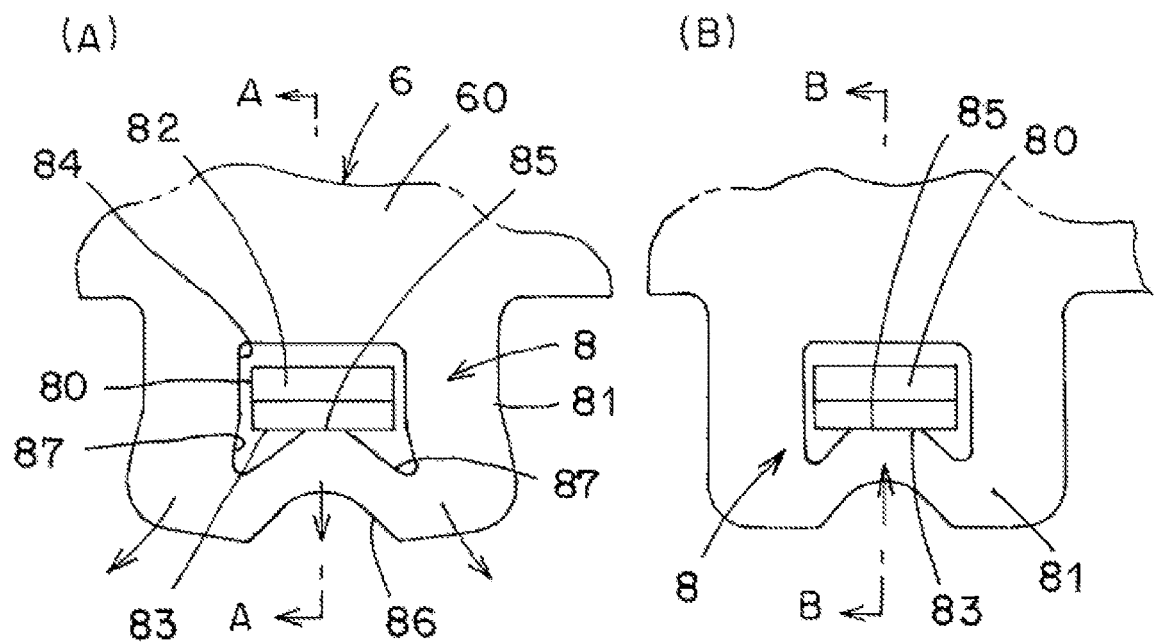
FIG. 7 illustrates partially enlarged front views illustrating a fitting member. (A) is a partially enlarged front view illustrating a state in which an elastically deformable fitting piece is elastically deformed. (B) is a partially enlarged front view illustrating a state in which a fitting protruding unit and the elastically deformable fitting piece are fitted to each other.

While the general fitting piece 810 has a quadrangular shape, the elastically deformable fitting piece 81 has a shape in which an arc-shaped recessed unit 86 is provided in a central portion of the lower edge as illustrated in FIG. 7. While the fitting opening unit 840 of the general fitting piece 810 has a quadrangular shape, the fitting opening unit 84 of the elastically deformable fitting piece 81 has a shape in which triangular-shaped recessed units 87 are provided on both the left and right sides of the lower edge as illustrated in FIG. 7. The surface of the central portion (a portion between the recessed units 87 on both the left and right sides) of the lower edge of the fitting opening unit 84 forms an elastic contact surface 85 that comes into elastic contact with the horizontal surface 83 of the fitting protruding unit 80. A portion of the elastically deformable fitting piece 81 below the lower edge of the fitting opening unit 84 is elastically deformed.

Explanation of Fitting State of Fitting Member 8

Figure 3:
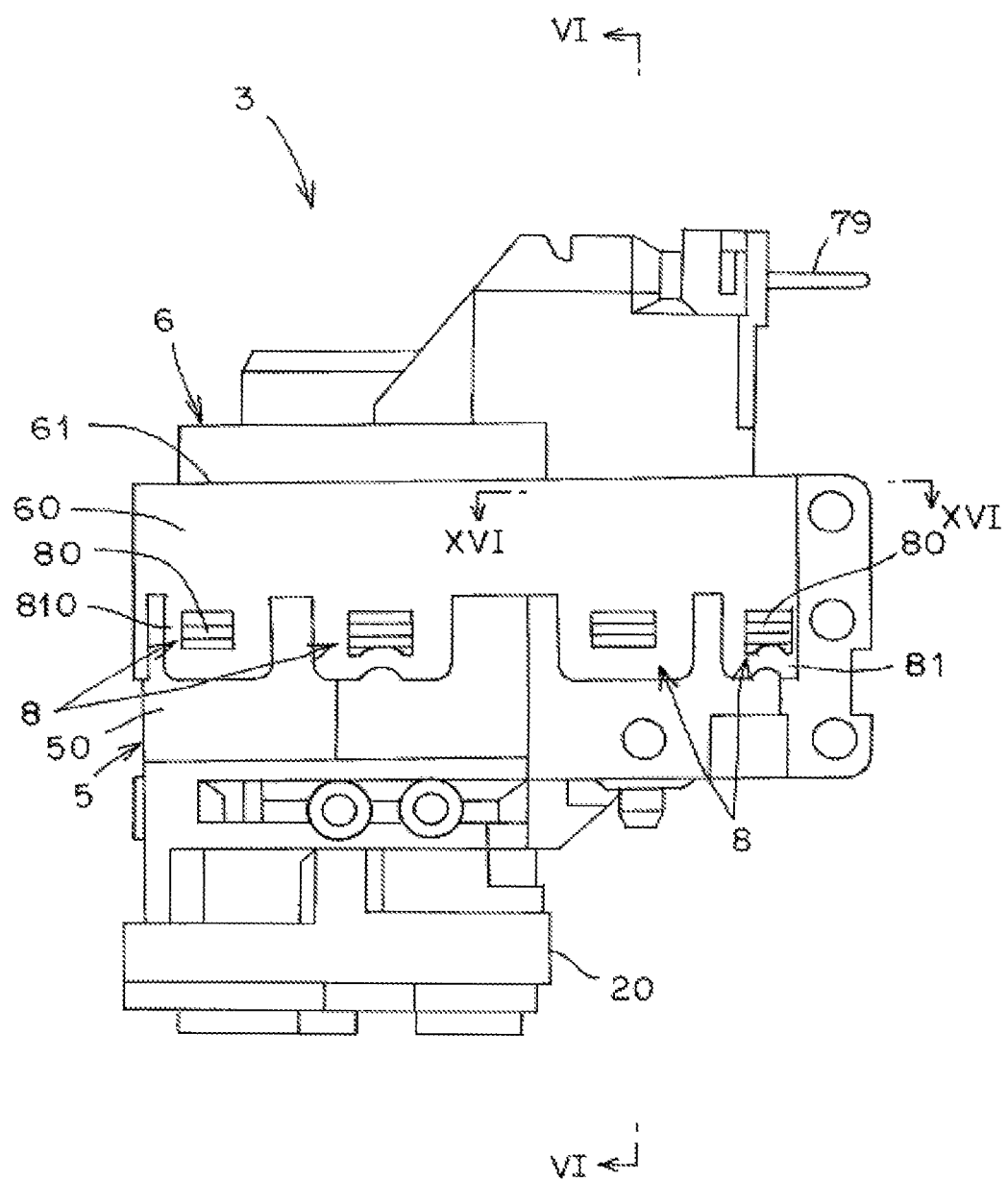
FIG. 3 is a front view (a view corresponding to FIG. 2) illustrating an electric storage unit.
Figure 4:
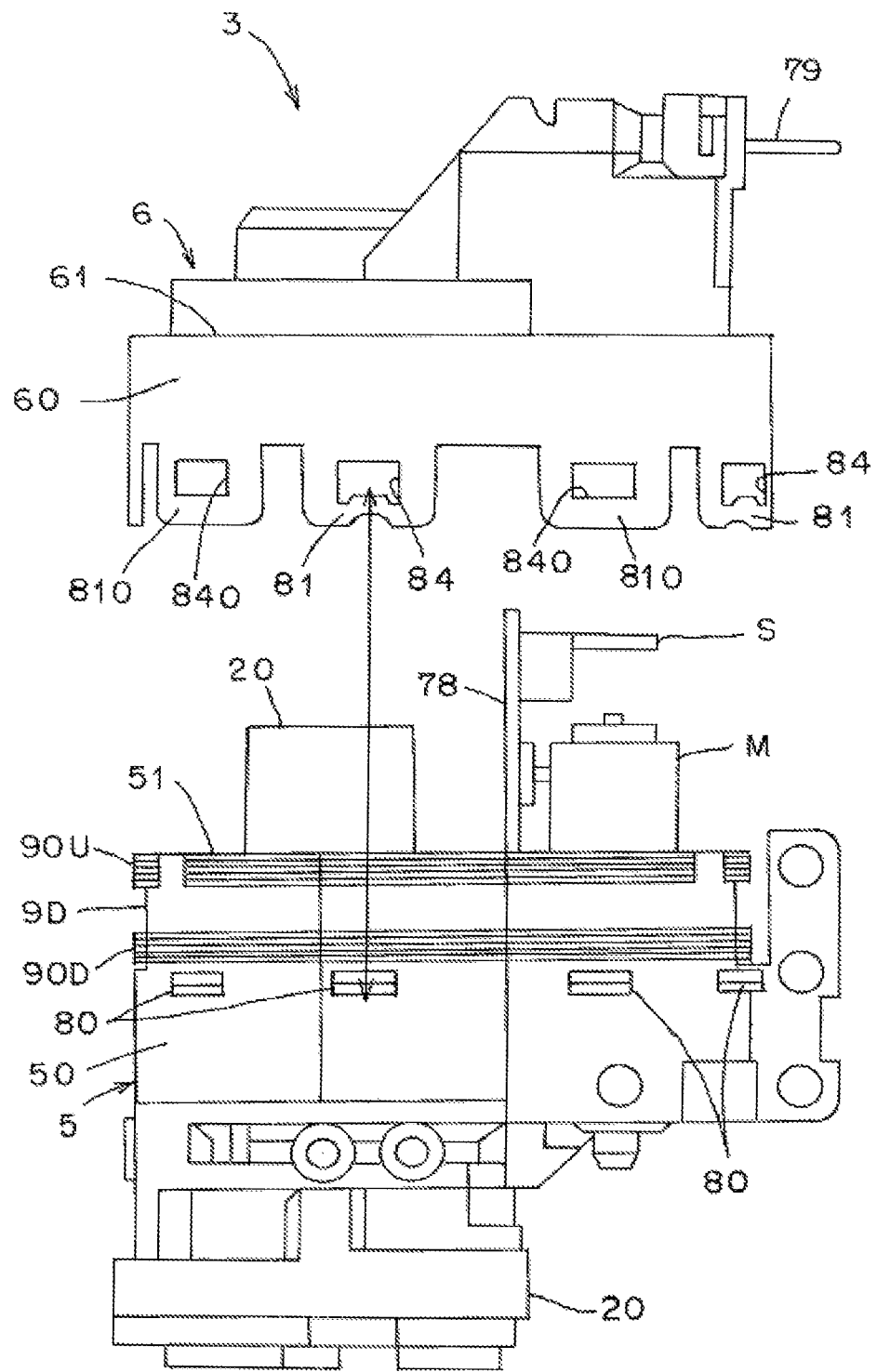
FIG. 4 is a front view (a view corresponding to FIG. 2) of the electric storage unit with a cover being removed from a shaft and a gear case.

As illustrated in FIGS. 3, 7(A) and 8(A), the fitting protruding unit 80 is fitted into the fitting opening unit 84 of the elastically deformable fitting piece 81. At this time, the elastically deformable fitting piece 81 is open to the outside along the inclined surface 82 of the fitting protruding unit 80.

Once the elastic contact surface 85 of the elastically deformable fitting piece 81 reaches the horizontal surface 83 of the fitting protruding unit 80, the elastically deformable fitting piece 81 opened to the outside starts to close inward (FIG. 8) (see the solid line arrow in FIG. 8(A)). At this time, the elastically deformable fitting piece 81 is elastically deformed downward in the center line G direction of the shaft 20 as indicated by the solid line arrow in FIG. 7(A).

When the fitting protruding unit 80 is fitted into the fitting opening unit 84, the elastically deformable fitting piece 81, which has been elastically deformed, elastically returns to the original state as illustrated in FIG. 7(B), and the elastic contact surface 85 of the elastically deformable fitting piece 81 comes into elastic contact with the horizontal surface 83 of the fitting protruding unit 80 as illustrated in FIG. 8(B). In other words, the elastically deformable fitting piece 81 and the fitting protruding unit 80 are elastically fitted to each other. At this time, the elastic recovery force of the elastically deformable fitting piece 81 acts on the fitting protruding unit 80 as indicated by the solid line arrow in FIG. 7(B). As a result, the cover 6 is lowered with respect to the gear case 5 in the center line G direction of the shaft 20 as indicated by the solid line arrow in FIG. 8(B).

Further, as illustrated in FIGS. 3 and 10(A), the fitting protruding unit 80 is fitted into the fitting opening unit 840 of the general fitting piece 810. At this time, the general fitting piece 810 is in a state of being opened outward along the inclined surface 82 of the fitting protruding unit 80.

Once the contact surface 850 of the general fitting piece 810 reaches the horizontal surface 83 of the fitting protruding unit 80, the general fitting piece 810 that has been opened to the outside closes inward. As a result, the fitting protruding unit 80 is fitted into the fitting opening unit 840, and then the general fitting piece 810 and the fitting protruding unit 80 are fitted to each other. At this time, as illustrated in FIG. 10(B), there is a gap between the contact surface 850 of the general fitting piece 810 and the horizontal surface 83 of the fitting protruding unit 80. This gap is generated by the locus when the general fitting piece 810 that has been opened to the outside closes inward, and the component tolerance.

Since the contact surface 850 of the general fitting piece 810 contacts with the horizontal surface 83 of the fitting protruding unit 80 if the cover 6 is raised upward in the direction of the center line G of the shaft 20 with respect to the gear case 5 as indicated by the solid line arrow in FIG. 10(B), the cover 6 does not come off from the gear case 5. In this way, the elastically deformable fitting piece 81 and the fitting protruding unit 80 are elasticity fitted to each other and the general fitting piece 810 and the fitting protruding unit 80 are fitted to each other, and thus the cover 6 is attached to the gear case 5.

Figure 11:
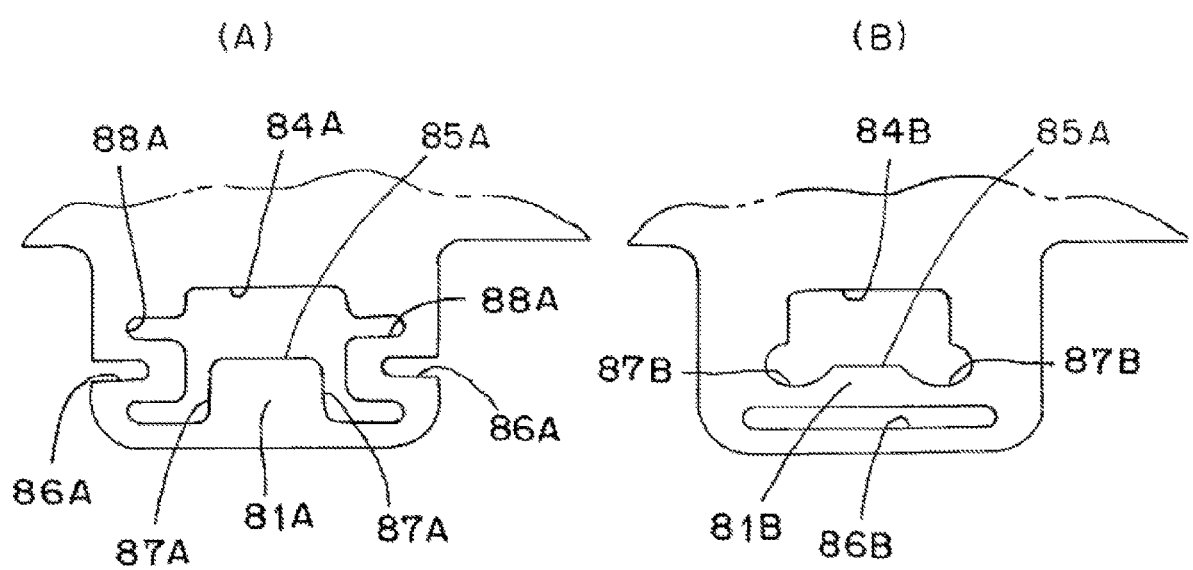
FIG. 11 illustrates partially enlarged front views illustrating modifications of the elastically deformable fitting piece. (A) is a partially enlarged front view illustrating a first modification of the elastically deformable fitting piece. (B) is a partially enlarged front view illustrating a second modification of the elastically deformable fitting piece.
Figure 12:
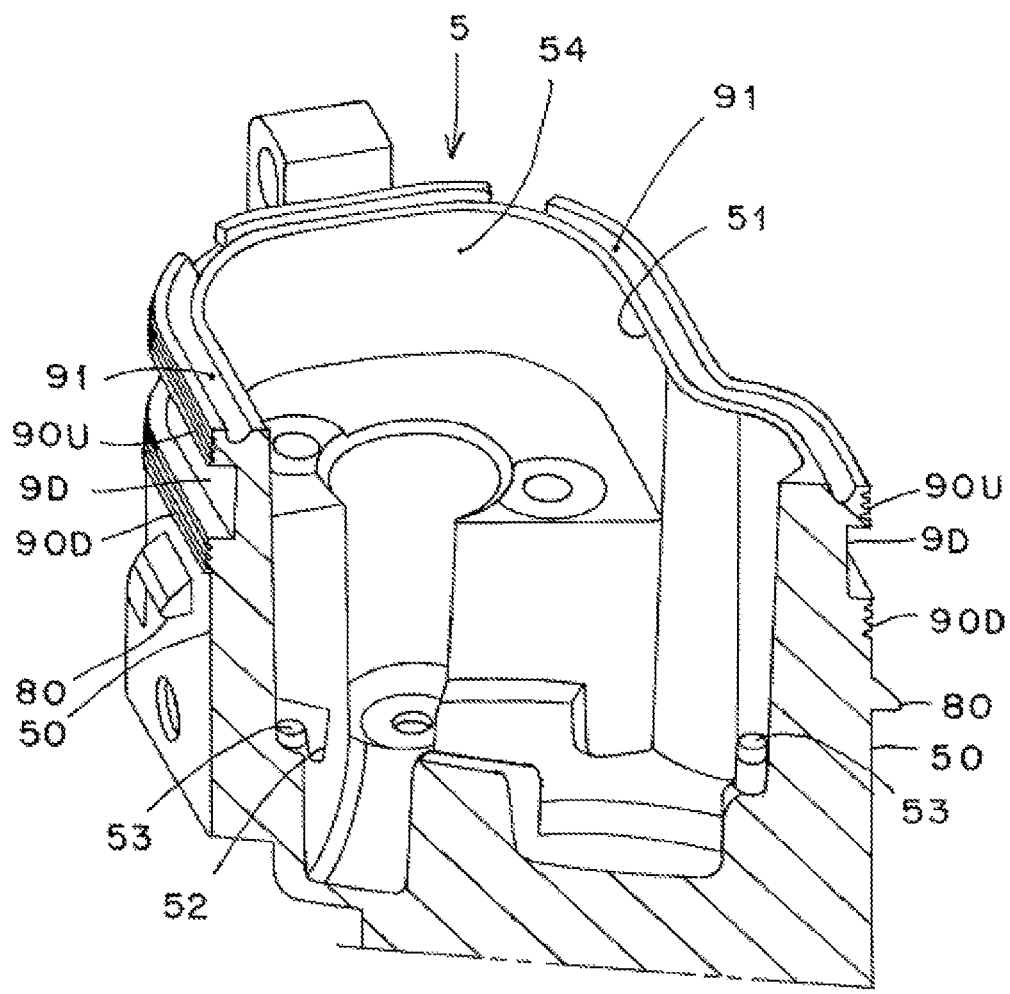
FIG. 12 is a perspective view (a perspective view seen from diagonally above) illustrating a partially broken gear case.

Explanation of Elastically Deformable Fitting Pieces 81A and 81B of First and Second Modifications FIGS. 11(A) and 11(B) are partially enlarged front views illustrating first and second modifications of elastically deformable fitting pieces 81A and 81B, respectively. Hereinafter, the elastically deformable fitting pieces 81A and 81B of the first and second modifications will be described.

While the general fitting piece 810 has a quadrangular shape, the elastically deformable fitting piece 81A of the first modification illustrated in FIG. 11(A) has a shape in which short slits 86A are provided on both the left and right side edges. While the fitting opening unit 840 of the general fitting piece 810 has a quadrangular shape, a fitting opening unit 84A of the elastically deformable fitting piece 81A of the first modification has a shape in which L-shaped recessed units 87A are provided on both the left and right sides of the lower edge and notches 88A are provided at both the left and right edges as illustrated in FIG. 11(A). The surface of a central portion of the lower edge of the fitting opening unit 84A (a portion between the recessed units 87A on both the left and right sides) forms an elastic contact surface 85A. Each of the short slits 86A of the elastically deformable fitting piece 81A is located between the recessed unit 87A of the fitting opening unit 84A and the notch 88A.

While the general fitting piece 810 has a quadrangular shape, the elastically deformable fitting piece 81B of the second modification illustrated in FIG. 11(B) has a shape in which a long slit 86B is provided in a lower portion. While the fitting opening unit 840 of the general fitting piece 810 has a quadrangular shape, a fitting opening unit 84B of the elastically deformable fitting piece 81B of the second modification has a shape in which arc-shaped recessed units 87B are provided on both the left and right sides of the lower edge as illustrated in FIG. 11(B). The surface of a central portion of the lower edge of the fitting opening unit 84B (a portion between the recessed units 87B on both the left and right sides) forms an elastic contact surface 85B.

The elastically deformable fitting pieces 81A and 81B of the first and second modifications can achieve the same functionality as the elastically deformable fitting piece 81, that is, the fitting state.

Explanation of Waterproof Structure Between Gear Case 5 and Cover 6

As illustrated in FIGS. 5, 6, 8, 10, and 12, between the outer surface of the upper end unit of the upright wall 50 of the gear case 5 above the fitting member 8 and the inner surface of the fitting wall 60 of the cover 6 above the fitting member 8, an upper narrow passage unit 90U, a lower widening space unit 9D, and the lower narrow passage unit 90D are provided in the circumferential direction and in the vertical direction. An upper widening space unit 6U is provided between the upper end surface of the upright wall 50 and the lower surface of the cover wall 61 in the circumferential direction. A water receiving groove 91 is provided on the upper end surface of the upright wall 50 in the circumferential direction. A draining lip unit 92 is provided on the lower surface of the cover wall 61 in the circumferential direction to face the water receiving groove 91.

Explanation of Assembled State of Electric Storage Unit 3

Once the cover 6 is attached to the gear case 5 by the fitting member 8, the cover 6 is lowered in the center line G direction of the shaft 20 with respect to the gear case 5 due to the elastic action of the elastically deformable fitting piece 81, as indicated by the solid line arrow in FIG. 8(B). At this time, as illustrated in FIGS. 15(A) and 15(B), the upper end surface of the positioning protruding unit 53 of the gear case 5 contacts with the positioning contact surface 63 of the cover 6. As a result, the cover 6 is attached to the gear case 5 in a positioned state. In other words, the cover 6 is lowered to and stabilized at a positioning reference (a contact position between the positioning protruding unit 53 and the positioning contact surface 63).

At the time when the positioning protruding unit 53 and the positioning contact surface 63 are in contact with each other, a clearance I between the upper surface of the shaft 730 of the second worm gear 73 borne by the bearing unit 52 of the gear case 5 and the lower end surface of the holding unit 62 of the cover 6 is maintained at an optimum clearance initially set, as illustrated in FIGS. 15(A) and 15(B).

Explanation of Functionality of Embodiment

The electric storage unit 3 and the electric storable door mirror device 1 according to the present embodiment have the above-described configurations, and their functionalities will be described below.

Explanation of Electric Storing

First, as illustrated in FIG. 1, in a state where the mirror assembly 4 is located at the use position A (use state), a switch (not illustrated) in the interior of the automobile is operated to supply power to the motor M via the connector 79, the socket S, and the substrate 78 and thus to drive the motor M. Then, the rotational force of the motor M is transmitted to the clutch gear 74 fixed to the shaft 20 via the output shaft, and the first worm gear 71, the helical gear 72, and the second worm gear 73 of the reduction mechanism. At this time, since the clutch gear 74 and the clutch holder 75 cannot rotate with respect to the shaft 20, the second worm gear 73 of the reduction mechanism uses the clutch gear 74 as a fixed gear to rotationally move around the center line G (rotation center line G) of the shaft 20 due to the rotation transmitted from the motor M. As a result of the rotational movement, as illustrated in FIG. 1, the mirror assembly 4 having the electric storage unit 3 built in rotationally moves from the use position A to the rearward storage position B around the center line G of the shaft 20, that is, clockwise as viewed from above.

Explanation of Electric Return

Next, as illustrated in FIG. 1, in a state where the mirror assembly 4 is located at the rearward storage position B (stored state), a switch (not illustrated) in the interior of the automobile is operated to drive the motor M. Then, the rotational force of the motor M is transmitted to the clutch gear 74, which is in a non-rotatable state, via the reduction mechanism. As a result, as illustrated in FIG. 1, the mirror assembly 4 having the electric storage unit 3 built in rotates from the rearward storage position B to the use position A around the center line G of the shaft 20, that is, counterclockwise as viewed from above.

Explanation of Buffer Rotation

As illustrated in FIG. 1, a force (a manual force, a force caused by something hitting the mirror assembly 4), which is a force in the clockwise or counterclockwise direction as viewed from above and larger than the electric rotational force, is applied to the mirror assembly 4 located at the use position A. Then, the gear case 5 attached to the mirror assembly 4 tries to rotate clockwise or counterclockwise as viewed from above. At this time, since the clutch holder 75 is non-rotatably fitted to the shaft 20, the clutch gear 74 pushes up the clutch holder 75, and the clutch gear 74 and the clutch holder 75 are thus disengaged from each other. At this time, the clutch holder 75 moves (rises) against the spring force of the spring 76.

As a result, the gear case 5 (including the cover 6, the motor M, and the rotational force transmission mechanism 7) rotates clockwise as viewed from above. As a result, as illustrated in FIG. 1, the mirror assembly 4 rotates from the use position A to the rearward storage position B, that is, counterclockwise as viewed from above, or from the use position A to the forward tilted position C, that is, counterclockwise as viewed from above, due to buffer action.

Explanation of Return of Buffer Rotation

Next, as illustrated in FIG. 1, a counterclockwise or clockwise force, as viewed from above, is applied to the mirror assembly 4 located at the rearward storage position B or the forward tilted position C due to buffer rotation. Then, the mirror assembly 4 rotates from the rearward storage position B or the forward tilted position C to the use position A, that is, counterclockwise or clockwise as viewed from above. At this time, the clutch holder 75 in the disconnected state with the clutch gear 74 moves (descends) due to the spring force of the spring 76, and thus the clutch gear 74 and the clutch holder 75 are in a connected state.

Explanation of Effect of Embodiment

The electric storage unit 3 and the electric storable door mirror device 1 according to the present embodiment have the above-described configurations and functionalities, and their effects will be described below.

Since the electric storage unit 3 and the electric storable door mirror device 1 according to the present embodiment do not require the seal member for the electric mirror of PTL 1, it is possible to sufficiently reduce the number of parts.

Moreover, in the electric storage unit 3 and the electric storable door mirror device 1 according to the present embodiment, the fitting member 8 includes the fitting protruding unit 80 provided on the gear case 5, and the elastically deformable fitting piece 81 provided on the cover 6, and the elastically deformable fitting piece 81 has the fitting opening unit 84 into which the fitting protruding unit 80 is fitted and is elastically deformed in the center line G direction of the shaft 20 to fit with the fitting protruding unit 80. As a result, in the electric storage unit 3 and the electric storable door mirror device 1 according to the present embodiment, the elastic contact surface 85 of the elastically deformable fitting piece 81 comes into elastic contact with the horizontal surface 83 of the fitting protruding unit 80, and thus there is no gap between the elastically deformable fitting piece 81 and the fitting protruding unit 80. Thus, the electric storage unit 3 and the electric storable door mirror device 1 according to the present embodiment can surely prevent the cover 6 from rattling even if the sealing member for the electric mirror of PTL 1 is eliminated.

As described above, since the electric storage unit 3 and the electric storable door mirror device 1 according to the present embodiment do not require the seal member for the electric mirror of PTL 1, it is possible to sufficiently reduce the number of parts.

In the electric storage unit 3 and the electric storable door mirror device 1 according to the present embodiment, the cover 6 is assembled to the gear case 5 by fitting the fitting protruding unit 80 of the fitting member 8 with the elastically deformable fitting piece 81 and the general fitting piece 810. As a result, the electric storage unit 3 and the electric storable door mirror device 1 according to the present embodiment can prevent water and dust from entering the gear case 5 and the inside of the cover 6, and can also suppress the motor M and the gears 71 to 74 from lifting up.

In the electric storage unit 3 and the electric storable door mirror device 1 according to the present embodiment, the cover 6 is further provided with the general fitting pieces 810, and each of the general fitting pieces 810 has the fitting opening unit 840 into which the fitting protruding unit 80 is fitted and is to be fitted with the fitting protruding unit 80 without being elastically deformed in the center line G direction of the shaft 20. As a result, in the electric storage unit 3 and the electric storable door mirror device 1 according to the present embodiment, if a force of raising the cover 6 upward with respect to the gear case 5 in the center line G direction of the shaft 20 (see the solid line arrow in FIG. 10(B)) acts on the cover 6, the contact surface 850 of the general fitting piece 810 contacts with the horizontal surface 83 of the fitting protruding unit 80. Thus, the electric storage unit 3 and the electric storable door mirror device 1 according to the present embodiment can restrict the upward movement of the cover 6 even if a large upward force is applied to the cover 6, and can thus limit the amount of elastic deformation of the elastically deformable fitting piece 81. Therefore, in the electric storage unit 3 and the electric storable door mirror device 1 according to the present embodiment, even if a force equal to or greater than the force applied at the time of electric operation (e.g., a load when the motor M is stalled, a force when the clutch is released, etc.) acts on the cover 6, the fitting state of the general fitting piece 810 and the fitting protruding unit 80 does not come off as a matter of course, and the fitting state of the elastically deformable fitting piece 81 and the fitting protruding unit 80 does not also come off. Accordingly, the assembled state of the gear case 5 and the cover 6 is maintained.

In the electric storage unit 3 and the electric storable door mirror device 1 according to the present embodiment, the gear case 5 and the cover 6 are provided with the positioning protruding unit 53 and the positioning contact surface 63, respectively. The positioning protruding unit 53 and the positioning contact surface 63 are serve as a positioning unit for defining the position of the cover 6 with respect to the gear case 5 in the center line G direction of the shaft 20. As a result, in the electric storage unit 3 and the electric storable door mirror device 1 according to the present embodiment, the cover 6 can be lowered to and stabilized at the positioning reference as a result of synergy between the elastic action of the elastically deformable fitting piece 81 (an action of lowering the cover 6, see the solid line arrow in FIG. 8(B)) and the positioning action of the positioning units (positioning protruding unit 53 and positioning contact surface 63).

In the electric storage unit 3 and the electric storable door mirror device 1 according to the present embodiment, the gear case 5 is provided with the bearing units 52 for bearing the shaft 730 of the second worm gear 73 in a state where the rotation center line H of the second worm gear 73 and the center line G of the shaft 20 are perpendicular to each other, while the cover 6 is provided with the holding units 62 for holding the shaft 730 of the second worm gear 73 and maintaining the clearance I in the center line G direction of the shaft 20. As a result, the electric storage unit 3 and the electric storable door mirror device 1 according to the present embodiment can set the clearance I as small as possible within a range that does not cause a load under environmental temperature and humidity conditions. Thus, the electric storage unit 3 and the electric storable door mirror device 1 according to the present embodiment can stabilize the positions of the second worm gear 73 as well as the other gears 71, 72, 74, and can eliminate the variation in the operating sound of the gears 71 to 74.

In the electric storage unit 3 and the electric storable door mirror device 1 according to the present embodiment, the bearing units 52 and the holding units 62 are set in the proximity of the positioning units (positioning protruding unit 53 and positioning contact surface 63, respectively). As a result, in the electric storage unit 3 and the electric storable door mirror device 1 according to the present embodiment, it is possible to easily achieve high accuracy in production as compared with the case where the bearing units 52 and the holding units 62 are set apart from the positioning units (positioning protruding unit 53 and positioning contact surface 63).

In the electric storage unit 3 and the electric storable door mirror device 1 according to the present embodiment, the gear case 5 is provided with the enclosure unit 54 that has a shape similar to the outer shape of the motor M and surrounds the motor M from the outside, while the cover 6 is provided integrally with the interposition member 64 that has a similar shape to the outer shape of the motor M and is interposed between the enclosure unit 54 and the motor M in an elastically deformed state. As a result, in the electric storage unit 3 and the electric storable door mirror device 1 according to the present embodiment, since the interposition member 64 is interposed, in the elastically deformed state, between the enclosure unit 54 of the gear case 5 made of a highly rigid material and the motor M whose outer shape is substantially a rigid body, it is possible to hold the motor M in the gear case 5 in a stable state without causing rattling via the interposition member 64. Thus, the electric storage unit 3 and the electric storable door mirror device 1 according to the present embodiment can prevent a problem due to rattling between the motor M and the gear case 5, for example, a problem such as generation of shaking noise during actuation of the motor M, or displacement of positions of the gears 71 to 74 causing a displacement in their meshing.

At high temperatures, the rattling between the motor M and the gear case 5 tends to occur more considerably due to a difference between their coefficients of linear thermal expansion, and the above-mentioned problems tend to occur accordingly. On the contrary, the electric storage unit 3 and the electric storable door mirror device 1 according to the present embodiment can prevent the above-mentioned problems from occurring even at high temperatures.

In the electric storage unit 3 and the electric storable door mirror device 1 according to the present embodiment, the interposition member 64 integrated with the cover 6 is interposed between the gear case 5 and the motor M in the elastically deformed state, and this makes it possible to assemble the gear case 5, the cover 6, and the motor M to one another without rattling. Moreover, in the electric storage unit 3 and the electric storable door mirror device 1 according to the present embodiment, since the periphery of the motor M is surrounded by the interposition member 64, it is possible to absorb the vibration and noise of the motor M.

In the electric storage unit 3 and the electric storable door mirror device 1 according to the present embodiment, the interposition member 64 is provided with the ribs 65 and each of the ribs 65 contacts with the enclosure unit 54 or the motor M. As a result, in the electric storage unit 3 and the electric storable door mirror device 1 according to the present embodiment, it is possible to assemble the gear case 5, the cover 6, and the motor M without rattling even under the conditions of the component tolerance, the widening of the gap at high temperatures, and the reduction of the gap at low temperatures. In particular, by alternately providing the ribs 65 that contact with the enclosure unit 54 and the ribs 65 that contact with the motor M, the functionality and effect of the ribs 65 are improved.

In the electric storage unit 3 and the electric storable door mirror device 1 according to the present embodiment, the gear case 5 is made from a highly-rigid member, and thus the gear case 5 is suitable as a member that connects the shaft 20 attached to the door D and the mirror housing 40 of the mirror assembly 4 and that requires high rigidity. On the other hand, in the electric storage unit 3 and the electric storable door mirror device 1 according to the present embodiment, since the cover 6 is made of an elastic resin material, the cover 6 is suitable as a member provided with the fitting pieces 81 and 810 of the fitting member 8 and also a member provided with the interposition member 64.

In the electric storage unit 3 and the electric storable door mirror device 1 according to the present embodiment, the upper narrow passage unit 90U, the lower widening space unit 9D, and the lower narrow passage unit 90D are provided in the circumferential direction and in the vertical direction between the outer surface of the upper end unit of the upright wall 50 of the gear case 5 above the fitting protruding unit 80 of the fitting member 8 and the inner surface of the fitting wall 60 of the cover 6 above the fitting pieces 81 and 810 of the fitting member 8. Further, in the electric storage unit 3 and the electric storable door mirror device 1 according to the present embodiment, the upper widening space unit 9U is provided in the circumferential direction between the upper end surface of the upright wall 50 of the gear case 5 and the lower surface of the cover wall 61 of the cover 6. Furthermore, in the electric storage unit 3 and the electric storable door mirror device 1 according to the present embodiment, the water receiving groove 91 is provided in the circumferential direction on the upper end surface of the upright wall 50 of the gear case 5, and the draining lip unit 92 is provided in the circumferential direction on the lower surface of the cover wall 61 of the cover 6 to face the water receiving groove. As a result, the electric storage unit 3 and the electric storable door mirror device 1 according to the present embodiment can prevent water and dust from entering the gear case 5 and the inside of the cover 6.

In particular, in the electric storage unit 3 and the electric storable door mirror device 1 according to the present embodiment, the waterproof structure (upper narrow passage unit 90U, lower widening space unit 9D, lower narrow passage unit 90D, upper widening space unit 9U, water receiving groove 91, and draining lip unit 92) is provided at a position above the fitting protruding unit 80 and the fitting pieces 81 and 810 of the fitting member 8 on the upright wall 50 of the gear case 5 and the fitting wall 60 of the cover 6. As a result, in the electric storage unit 3 and the electric storable door mirror device 1 according to the present embodiment, the waterproof function due to the waterproof structure between the gear case 5 and the cover 6 can work well without affecting the function of the fitting member 8 assembling the gear case 5 and the cover 6. Further, in the electric storage unit 3 and the electric storable door mirror device 1 according to the present embodiment, the function of the fitting member 8 assembling the gear case 5 and the cover 6 can work well without affecting the waterproof function due to the waterproof structure between the gear case 5 and the cover 6.

Explanation of Examples Other Than Embodiment

In the above embodiment, the cover 6 is provided with the elastically deformable fitting piece 81, 81A, or 81B having the fitting opening unit 84, 84A, or 84B. In the present invention, the elastic force and elastic characteristics of the elastically deformable fitting pieces 81, 81A, and 81B may be adjusted by adjusting the wall thicknesses and shapes of the elastically deformable fitting pieces 81, 81A, and 81B and the shapes of the fitting opening units 84, 84A, and 84B.

In the above-described embodiment, the cover 6 is provided integrally with the interposition member 64. However, in the present invention, the interposition member 64 may be separate from the cover 6.

In the above-described embodiment, the interposition member 64 is provided with the ribs 65. However, in the present invention, the interposition member 64 may not be provided with the ribs 65.

The present invention is not limited by the above-described embodiment. In particular, the shape of the fitting protruding unit 80, the shapes of the elastically deformable fitting pieces 81, 81A, and 81B, the shapes of the fitting opening units 84, 84A, and 84B, and the like are not limited by the above-described embodiment.

DESCRIPTION OF REFERENCE NUMERALS

1 Electric storable door mirror device (vehicle outside mirror device)
2 Base
20 Shaft
3 Electric storage unit
4 Mirror assembly
40 Mirror housing
41 Mirror
5 Gear case
50 Upright wall
51 Upper opening unit
52, 55 Bearing unit
53 Positioning protruding unit
54 Enclosure unit
6 Cover
60 Fitting wall
61 Cover wall
62 Holding unit 63 Positioning contact surface
64 Interposition member
65 Rib
7 Rotational force transmission mechanism
70 Stopper member
71 First worm gear
72 Helical gear
73 Second worm gear
730 Shaft
74 Clutch gear
75 Clutch holder
76 Spring
77 Push nut
78 Substrate
79 Connector
8 Fitting member
80 Fitting protruding unit
81, 81A, 81B Elastically deformable fitting piece
810 General fitting piece
84, 84A, 84B, 840 Fitting opening unit
85, 85A, 85B Elastic contact surface
850 Contact surface
86 Recessed unit
86A Short slit
86B Long slit
87, 87A, 87B Recessed unit
88A Notch
9U Upper widening space unit
9D Lower widening space unit
90U Upper narrow passage unit
90D Lower narrow passage unit
91 Water receiving groove
92 Draining lip unit
A Use position
B Rearward storage position
C Forward tilted position
D Door (vehicle body)
E Rear of vehicle
F Front of vehicle
G Rotation center line (center line of shaft 20)
H Rotation center line of second worm gear 73
I Clearance
M Motor
S Socket

The invention claimed is:

1. An electric storage unit for a vehicle outside mirror device that electrically rotates a mirror assembly with respect to a vehicle body, the electric storage unit comprising:
a shaft fixed to the vehicle body;
a gear case rotatably attached to the shaft, the mirror assembly being attached to the gear case;
a cover attached to the gear case; and
a motor and a rotational force transmission mechanism housed in the gear case and the cover, wherein
the gear case has an upright wall surrounding the motor and the rotational force transmission mechanism and an upper portion of the upright wall is open,
the cover has a fitting wall fitted from outside onto the periphery of the upper portion of the upright wall and a cover wall covering an opening unit of the upright wall,
the upright wall and the fitting wall are provided with a fitting member for assembling the gear case and the cover together, and
the fitting member includes
a fitting protruding unit provided on the gear case, the fitting protruding unit including an upper inclined surface and a lower horizontal surface, and
an elastically deformable fitting piece provided on the cover and having a first fitting opening into which the fitting protruding unit is fitted, a lower edge of the first fitting opening forming an elastic contact surface that comes into contact with the horizontal surface of the fitting protruding unit such that a portion of the elastically deformable fitting piece below the elastic contact surface elastically deforms downward in a direction of a center line of the shaft when fitted with the fitting protruding unit, and a portion of the inclined surface of the fitting protruding unit is disposed in the first fitting opening.

2. The electric storage unit for the vehicle outside mirror device according to claim 1, wherein the cover is further provided with a general fitting piece having a second fitting opening into which the fitting protruding unit is fitted, and the general fitting piece is configured to be fitted with the fitting protruding unit without elastically deforming in the direction of the center line of the shaft.

3. The electric storage unit for the vehicle outside mirror device according to claim 1, wherein
the rotational force transmission mechanism has a worm gear,
the gear case is provided with a bearing unit for bearing a shaft of the worm gear in a state where a rotation center line of the worm gear and the center line of the shaft are perpendicular to each other,
the cover is provided with a holding unit for holding the shaft of the worm gear and maintaining a clearance in the direction of the center line of the shaft,
each of the gear case and the cover is provided with a positioning unit for defining a position of the cover with respect to the gear case in the direction of the center line of the shaft, and
each of the bearing unit and the holding unit is set in the proximity of the positioning unit.

4. The electric storage unit for the vehicle outside mirror device according to claim 1, wherein
the gear case is provided with an enclosure unit surrounding the motor from outside, and
the electric storage unit further comprises an interposition member interposed between the enclosure unit and the motor in an elastically deformed state.

5. The electric storage unit for the vehicle outside mirror device according to claim 4, wherein the interposition member is provided with ribs and each of the ribs contacts with the enclosure unit or the motor.

6. The electric storage unit for the vehicle outside mirror device according to claim 4, wherein the interposition member is provided integrally with the cover.

7. The electric storage unit for the vehicle outside mirror device according to claim 1, wherein
the gear case is made from a rigid member, and
the cover is made from an elastic member.

8. The electric storage unit for the vehicle outside mirror device according to claim 1, wherein
an upper narrow passage unit, a lower widening space unit, and a lower narrow passage unit are provided in a circumferential direction and in a vertical direction between an outer surface of an upper end unit of the upright wall above the fitting member and an inner surface of the fitting wall above the fitting member, an upper widening space unit is provided between an upper end surface of the upright wall and a lower surface of the cover wall in a circumferential direction, a water receiving groove is provided on the upper end surface of the upright wall in a circumferential direction, and a draining lip unit is provided on the lower surface of the cover wall in a circumferential direction to face the water receiving groove.

9. A vehicle outside mirror device, comprising:
a base fixed to a vehicle body;
the electric storage unit according to claim 1; and
a mirror assembly rotatably attached to the base via the electric storage unit.

10. An electric storage unit for a vehicle outside mirror device that electrically rotates a mirror assembly with respect to a vehicle body, the electric storage unit comprising:
a shaft fixed to the vehicle body;
a gear case rotatably attached to the shaft, the mirror assembly being attached to the gear case;
a cover attached to the gear case; and
a motor and a rotational force transmission mechanism housed in the gear case and the cover, wherein
the gear case has an upright wall surrounding the motor and the rotational force transmission mechanism and an upper portion of the upright wall is open,
the cover has a fitting wall fitted from outside onto the periphery of the upper portion of the upright wall and a cover wall covering an opening unit of the upright wall,
the upright wall and the fitting wall are provided with a fitting member for assembling the gear case and the cover together,
the fitting member includes
a fitting protruding unit provided on the gear case, and
an elastically deformable fitting piece provided on the cover and having a fitting opening unit into which the fitting protruding unit is fitted, the elastically deformable fitting piece being configured to elastically deform in a direction of a center line of the shaft to be fitted with the fitting protruding unit,
the rotational force transmission mechanism has a worm gear,
the gear case is provided with a bearing unit for bearing a shaft of the worm gear in a state where a rotation center line of the worm gear and the center line of the shaft are perpendicular to each other,
the cover is provided with a holding unit for holding the shaft of the worm gear and maintaining a clearance in the direction of the center line of the shaft, each of the gear case and the cover is provided with a positioning unit for defining a position of the cover with respect to the gear case in the direction of the center line of the shaft, and each of the bearing unit and the holding unit is set in the proximity of the positioning unit.

11. An electric storage unit for a vehicle outside mirror device that electrically rotates a mirror assembly with respect to a vehicle body, the electric storage unit comprising:
a shaft fixed to the vehicle body;
a gear case rotatably attached to the shaft, the mirror assembly being attached to the gear case;
a cover attached to the gear case; and
a motor and a rotational force transmission mechanism housed in the gear case and the cover, wherein
the gear case has an upright wall surrounding the motor and the rotational force transmission mechanism and an upper portion of the upright wall is open,
the cover has a fitting wall fitted from outside onto the periphery of the upper portion of the upright wall and a cover wall covering an opening unit of the upright wall,
the upright wall and the fitting wall are provided with a fitting member for assembling the gear case and the cover together,
the fitting member includes
a fitting protruding unit provided on the gear case, and
an elastically deformable fitting piece provided on the cover and having a fitting opening unit into which the fitting protruding unit is fitted, the elastically deformable fitting piece being configured to elastically deform in a direction of a center line of the shaft to be fitted with the fitting protruding unit,
an upper narrow passage unit, a lower widening space unit, and a lower narrow passage unit are provided in a circumferential direction and in a vertical direction between an outer surface of an upper end unit of the upright wall above the fitting member and an inner surface of the fitting wall above the fitting member,
an upper widening space unit is provided between an upper end surface of the upright wall and a lower surface of the cover wall in a circumferential direction,
a water receiving groove is provided on the upper end surface of the upright wall in a circumferential direction, and
a draining lip unit is provided on the lower surface of the cover wall in a circumferential direction to face the water receiving groove.

* * * * *